United States Patent [19]

Parkinson et al.

[11] 3,902,162

[45] Aug. 26, 1975

[54] DATA COMMUNICATION SYSTEM INCORPORATING PROGRAMMABLE FRONT END PROCESSOR HAVING MULTIPLE PERIPHERAL UNITS

[75] Inventors: Kelvin L. Parkinson, Bolton; Robert J. Houde, Worcester, both of Mass.

[73] Assignee: Honeywell Information Systems, Inc., Waltham, Mass.

[22] Filed: Nov. 24, 1972

[21] Appl. No.: 309,587

[52] U.S. Cl. .......... 340/172.5
[51] Int. Cl.² .......... G06F 3/00
[58] Field of Search .......... 340/172.5

[56] References Cited

UNITED STATES PATENTS

| | | | |
|---|---|---|---|
| 3,559,187 | 1/1971 | Figueroa et al. | 340/172.5 |
| 3,573,741 | 4/1971 | Gavril | 340/172.5 |
| 3,602,702 | 8/1971 | Warnock | 340/172.5 |
| 3,614,742 | 10/1971 | Watson | 340/172.5 |
| 3,673,576 | 6/1972 | Donaldson | 340/172.5 |
| 3,742,289 | 6/1973 | Koeijmans | 340/172.5 |

*Primary Examiner*—Gareth D. Shaw
*Assistant Examiner*—Paul R. Woods
*Attorney, Agent, or Firm*—John S. Solakian; Ronald T. Reiling

[57] ABSTRACT

The data communication system comprises a front end processor having a plurality of peripheral units of various types connected thereto, a data multiplex unit, and a coupler connected to a central data processor. Each of the peripheral units has its own distinct address for establishing communication transfers with the central data processor. The coupler unit detects each of the distinct addresses of the peripheral units and has a special channel for requesting transfers of the status and/or data information for each of the plurality of peripheral units. The data multiplex unit is responsive to the special channel of the coupler and combines a dedicated memory address with the detected distinct address to identify the information, i.e. either the status or data, of the selected peripheral unit to be transferred. The coupler also includes circuitry which automatically controls the front end processor by indicating the source and direction of the communication transfer. Either a burst or multiplex mode of operation is provided for the communication transfer of data.

9 Claims, 4 Drawing Figures

DATA COMMUNICATION SYSTEM INCORPORATING PROGRAMMABLE FRONT END PROCESSOR HAVING MULTIPLE PERIPHERAL UNITS

BACKGROUND OF THE INVENTION

A. Field of the Invention

The invention relates to a data communication system and, more particularly, to such systems connecting a central data processor to a variety of peripheral units coupled to a front end processor.

B. Description of the Prior Art

Computer systems in which the main memory of the computer is time shared by one or more processing units and by a plurality of peripheral units have become well known in recent years. In such systems, a central data processor allocates requests for accesses to the main memory made by processors and by peripheral units. By operating in such a manner, many processing and input/output operations may be executed. Consequently, many users may operate the computer simultaneously, or apparently simultaneously, in such a way that each is, or may be, completely unaware of the use being made of the central data processor by others. Additionally, a number of programs may be executed such that none needs to be completed before another is started or continued.

In systems of the type described, there are peripheral units, or, as they are also known, input/output units, which ordinarily communicate with the central unit of the system via a plurality of input/output control units and a plurality of input/output channels. Each input/output unit such as a magnetic tape or magnetic disk will often have an individual control unit and an individual input/output channel associated with it since the rate of data transfer between such units may be relatively large. Each of these input/output units have an individual address by which they can communicate with the central data processor. This mode of operation decreases to a degree the operation of the central data processor since the latter must access a plurality of addresses for a communication transfer. However, the relative speed and necessity for communication transfers for these types of peripheral units makes this a desirable feature when viewing overall performance. Thus, for example, if a magnetic media is provided as a peripheral unit, the control of its operation and the accessing of information, when required, would be of primary importance and justify the central data processor assigning an individual address to it so that substantially instantaneous communication would result.

When a number of data communication lines which are relatively slow when compared to the above directly connected peripheral units must communicate with the central data processor, the speed limitations of the data communication lines make it uneconomical to provide an individual control unit and individual input/output unit for each line. In such a situation, a multiline controller or similar device has been utilized wherein the multiline controller has a distinct address vis-a-vis the central data processor. Since the multiline controller would have a number of peripheral units coupled to it, a subaddress, or as it is sometimes known, a header, in the message portion of the communication transfer would establish the proper communication link. This design configuration has the advantage that the central data processor only requires one distinct address to identify the multiline controller and hence saves time in identifying the particular input/output unit since the number of units it addresses are reduced. However, this design configuration has a disadvantage in that a part of the message being delivered must specify the particular peripheral unit. Since the time interval that a central data processor has for communicating with a peripheral unit is usually small and occurs between processing instructions, this form of communication transfer tends to increase the total computer time required for a complete message transfer. Moreover, since the remote stations may be of different types such as, for example, typewriter stations, teletype networks, or other data processing systems, and since the remote peripheral units may be connected in the data processor in any number of different ways such as, for example, telephone lines, telephone exchanges, etc., further difficulties of presenting data to the central processor are realized since the communication transfer is necessarily subjected to idiosyncrasies both as to the various type of peripheral unit and to the various means by which they are connected to the processor.

In the past, there was utilized special hardware elements for each of the above-recited input/output units so as to allow interfacing between the central data processor and the peripheral unit. In recent times, however, the demand for the control facilities has been too great for this approach to be economical. In order to meet the tremendous demand which has been apparent in the past few years, front end processors, or as they are also known, preprocessors, have provided the technological base for the development of general purpose communication control units and systems. However, such front end processors have not met with the sucess envisioned because of the above-mentioned problems with the directly connected peripheral units and the data communication lines.

More particularly, such front end processors have been directly attached to a selector or multiplex channel of the central data processor. There is no direct data path between the main storage facility of the central data processor and the peripheral units coupled to the preprocessor. Thus, every character has to be processed individually by a controlled program located within the preprocessor. This approach has tended to slow down the amount of data which may be transferred; however, maximum flexibility in treating the data to be transferred has been obtained. Since most front end processors are able to operate on data at rates well in excess of that required for monitoring and control of the input/output units connected to it, the apparent speed limitation of these input/output units has not provided great difficulty. Moreover, in view of the fact that the control program located in the front end processor supplied specialized processing for each of the input/output units, the need for hardware logic to perform these functions has been eliminated while the amount of information able to be delivered to the central data processor has been increased.

The major problem os using a front end processor in a communication system has been its comparative lack of extensive utilization. Thus, a front end processor is viewed much as a single peripheral unit by the central data processor. That is, the front end processor is considered to be only one peripheral unit on a central data processor's control network and hence has only one distinct address. Moreover, in the usual situation, one ·processor and the associated special control unit ; been used for each peripheral unit since communi- ion transfers for other types of peripheral units uld have to be translated to the type of peripheral it the preprocessor represents. Not only does this in- :ase the expense of the overall system, but it also un- :utilizes the front end processor since the latter has : capability to process communication transfers for 'eral distinct peripheral units. However, by the pres- t invention, the preprocessor represents distinct pe- heral units. Moreover, the preprocessor simulta- ously represents more than one peripheral unit :reby increasing the flexibility and use of the front d processor while minimizing the number of special ntrol units which are required in order for communi- tion transfers to occur with the central data process- ; system. By representing more than one peripheral it to the central data processor, the front end proces- r is made transparent to the peripheral unit address the central data processor. Stated differently, the ntral data processor is not aware that it is communi- ting with the front end processor but rather it be- ves that it is communicating individually with each of e peripheral units connected to the front end proces- r. Thus, the front end processor of the present inven- ›n is responsive to a plurality of distinct peripheral ıit addresses. While this increases the number of pe- ›heral unit addresses that the central data processor ust be cognizant of, it reduces the communication :lay problems that having one peripheral unit address ıtails. Moreover, since the preprocessor prepares a ›mmunication transfer to be made and does the nor- al functions of editing and processing, the time for a ›mmunication message to be transferred is signifi- ıntly reduced while the throughput to the central data :ocessor is increased. In this respect, the preprocessor :ovides much greater versatility than a multiline con- oller since the latter merely transfers the information ut does not perform any other function.

One difficulty of having a preprocessor represent ıultiple distinct addresses is the problem that the con- ol program must service the various addresses repre- :nted. With this procedure, the problem of responding › the individual peripheral units which are addressed y the central data processor is accentuated. The pres- nt invention overcomes this problem by providing spe- ial circuitry which identifies the peripheral unit repre- :nted, indicates the direction of information flow, and erforms an information transfer simultaneous with the ·ont end processor's program operation. These fea- ıres enable the front end processor to respond to the entral data processor within the allotted time period.

OBJECTS OF THE INVENTION

It is an object of this invention to provide an im- ›roved data communications system utilizing a pro- rammable front end processor.

It is another object of this invention to provide a front nd processor which can enter into communication ransfers with a central data processor as a plurality of lifferent peripheral units.

It is a further object of this invention to provide a pre- ›rocessor which represents multiple peripheral devices hereby minimizing the number of special control units ıecessary to communicate with a central data proces- or.

It is yet a further object of the invention to provide an improved data communications system wherein a plurality of peripheral units coupled to a front end processor are able to communicate with a central data processor by a plurality of distinct addresses, each address representing a unique peripheral unit.

It is yet another object of this invention to provide a programmable communication processor which automatically responds to the data processor with information from one of a plurality of individual peripheral units.

SUMMARY OF THE INVENTION

The foregoing objects are achieved according to one embodiment of the invention and according to one mode of operation thereof by providing in a data communication system, a programmable communication front end processor having a plurality of peripheral units which it interfaces with a central data processor. A coupler connected to the central data processor accepts each of the individual distinct addresses which identify the peripheral units represented by the front end processor and enables a transfer request for a communications exchange to occur. A data multiplex unit controls the transfer request and accesses information regarding the specified peripheral unit by combining an address specifying a section of the front end processor's memory which has the information of each peripheral unit with the individual distinct address of peripheral unit provided by the central data processor. Circuitry within the coupler provides a control bit to the data multiplex unit which indicates to the front end processor the direction of information transferal between the front end processor and the central data processor. The front end processor then supplies the status and/or data information via the coupler and under the control of the data multiplex unit to the central data processor such that communication transfer between the peripheral unit and the central processor may commence. A scanner associated with the coupler provides the updated data and status of each of the peripheral units such that automatic responses to the central data processor are possible. Multiple channels in the coupler provide for the reception and/or transmission of the requisite information so that increased information flow between the two processors is possible.

BRIEF DESCRIPTION OF THE DRAWINGS

The novel features which are characteristic of this invention are set forth with particularity in the appended claims. The invention itself, however, both as to its organization and operation together with further objects and advantages thereof may best be understood by reference to the following description taken in connection with the accompanying drawings in which:

DETAILED DESCRIPTION OF THE PREFERRED EMBODIMENT

Figure 1:
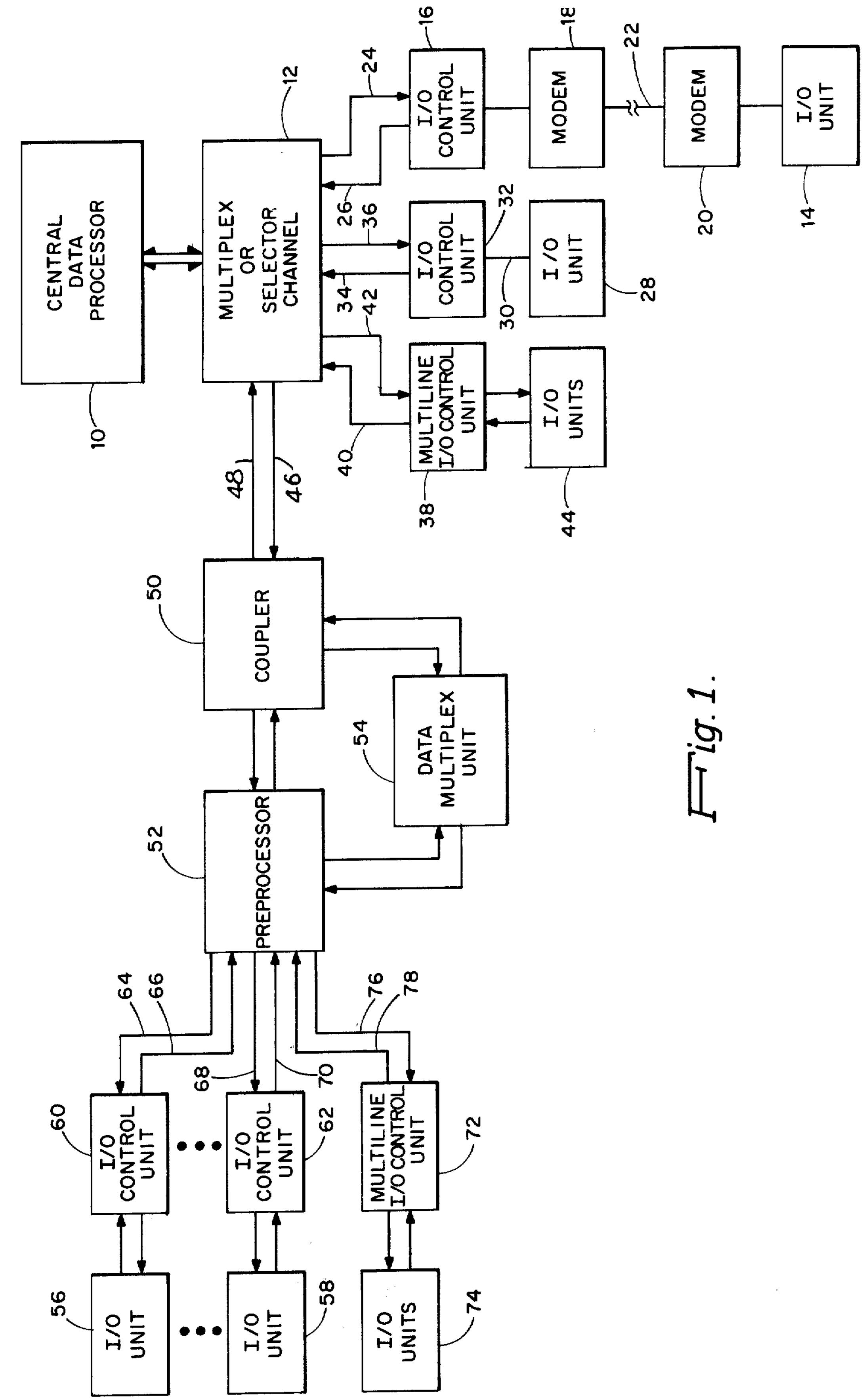
FIG. 1 is a block diagram illustrating a data communication system in which the present invention may be utilized.

Since the present invention pertains to data processing and to data communicating systems, the description thereof can become very complex. However, it is believed unnecessary to describe all the details of a data communication system to completely describe the present invention. Therefore, most of the details that are relatively well known in the art will be omitted from this description. Even though details are eliminated, a basic description will be given of the entire system to enable one skilled in the art to understand the environment in which the present invention is placed. Moreover, the same reference numerals have been used to designate corresponding elements throughout the respective views of the drawings where possible thereby facilitating a ready understanding of the relationships therebetween. Accordingly, reference is made to FIG. 1 showing a simplified block diagram of a data communication system which uses the present invention.

The data communications system shown in FIG. 1 includes a central data processor 10 connected to a multiplex and/or selector channel 12, hereinafter simply referred to as channel 12. Processor 10 manipulates data in accordance with the instruction of a program which may be stored in memory. The processor receives an instruction, decodes the instruction and performs the operation indicated thereby. The operation is performed upon data received by the processor and temporarily stored thereby during the operation. The series of instructions are called a program and include decodable operations to be performed by the processor. The instructions of the program are obtained sequentially by the processor and, together with the data to be operated upon, are stored in the memory. Communication with the central data processor usually takes place through the media of peripheral units or, as they also may be referred to, input/output units such as, for example, magnetic tape handlers, teletypewriters, tape readers, magnetic discs, punched card readers, and other remote terminal device. To control the receipt of information from the input/output units and to coordinate the transfer of information to and from such units, an input/output control means is required. Thus, an input/output controller or input/output multiplexer is usually provided and connects the central data processing system to the variety of input/output units. In the present environment, channel 12 is provided to access memory and performs these functions. Channel 12 coordinates the information flow to and from the various input/output units and also awards priority when more than one input/output unit is attempting to communicate with the data processing system. Since the input/output units are usually electromechanical in nature and necessarily have operating speeds which are much slower than the remainder of the data processing system, channel 12 provides for temporary storage to enable the processing system to proceed at its normal rate without waiting for the time-consuming communication with the input/output units. Due to this function of channel 12, a plurality of input/output operations may proceed simultaneously, or apparently simultaneously, and many units may thereby utilize the system in such a way that each can be completely unaware of the use of the system being made by others.

Whenever the input/output units desire to access the central data processor, or whenever the central data processor desired to access the input/output units, channel 12 provides a signal indicative of the desired operation. In cognizance of these signals, channel 12 allocates memory accesses to the particular input/output unit requested.

Channel 12 has a prescribed number of input/output channels, each of which is reserved for a single input/output control unit. For purposes of description herein, channel 12 may be considered to have a fixed number of such input/output channels. A remote input/output unit 14 is connected to a first input/output channel of channel 12 through an input/output control unit 16, via modems (modulator - demodulators) 18 and 20 at either end of a data communication line 22. These modems may be standard telephone data sets such as the Bell System 202D data set. Such data sets are available from the telephone company for transmitting binary information over standard telephone equipment. The first input/output channel is indicated by lines 24 and 26. Although lines 24 and 26 are shown in FIG. 1 as single lines for the purpose of clarity, as are other lines depicted in this drawing, in actuality, many lines may be utilized to transmit signals over the indicated paths.

Channel 12 may have a number of local input/output units connected to it. This is shown generally as an input/output unit 28 connected by line 30 to input/output control unit 32. While only one is shown, it is understood that many others may be similarly connected. The input/output channel of input/output control unit 32 is connected to channel 12 by lines 34 and 36.

Some input/output units which must communicate with central data processor 10 are much slower than others with respect to the speed and amount of information which is transferred. The allocation of a separate input/output channel by the central data processor 10 for each such slower speed unit would be uneconomical. Transmission of data over data communication lines, for example, is relatively slow compared to the rate of transmission between a computer system and an input/output unit connected directly thereto such as, for example, the input/output unit 28. In FIG. 1, a multiline input/output control unit 38 is utilized to connect a plurality of such data communication lines to the central data processor 10 by means of only one input/output channel. This input/output channel is indicated by lines 40 and 42. A plurality of input/output units 44 is connected to the multiline I/O input/output controller 38. Data transmitted between the central data processor 10 and the input/output units 44 connected to the multiline controller 38 is thus funneled into a single input/output channel connecting the control unit 38 with the channel 12. As a result, the total number of input/output units may be increased.

Also connected via another single input/output channel of channel 12 is a coupler 50. Coupler 50 is directly connected to channel 12 via buses 46 and 48 and provides an interface to a front end processor, or as it is also known, a preprocessor 52. Coupler 50 has a logic block to provide for selection, deselection, termination and data transfer capability between the front end processor 52 and the central data processor 10. In some respects, coupler 50 is similar to a multiline controller in that it provides for transfer of information of a plurality of peripheral units which are connected to the ɔnt end processor 52. However, it differs from the ultiline controller in that it per se does not multiplex e information received from channel 12. Rather, it nctions so that only one device which it represents ay be coupled to channel 12 at any given time. More- ɹer, coupler 50 differs from a multiline controller in at it detects the individual distinct peripheral unit ad- ·esses whereas the multiline controller has its own ad- ·ess and detects a subaddress or header in order to ac- ɜss the proper peripheral unit.

Preprocessor 52, like most central processing units, ɔntains its own internal storage array. This storage :ovides a residence for the control programs and a ·mporary storage area for data of peripheral units as is being assembled or disassembled in preparation for ansfer to the channel 12 or terminals to be subse- uently explained. The control program that resides in ıe preprocessor's storage controls the transfer of data ; it passes through the computer. The primary func- ons of the control program are related to transmitting nd receiving data. However, the control program also dits and processes the data of the communication ıessage. In performing its functions, the control pro- ram interacts with the coupler 50 to control the flow f data to the communications system. The program laces the data in storage of the preprocessor 52 where is then available to the coupler 50 to be sent to the entral data processor 10. When data is to be trans- ɜrred from the central processor 10 to a peripheral nit connected to the front end processor 52, the pro- ess is reversed. Thus, channel 12 sends the data to oupler 50 which, under circuit control, transfers the ata to storage of the preprocessor 52. An interrupt re- uest notifies the control program that information has ıeen transferred and the program will then take appro- ıriate actions via its subroutines. This is accomplished ia a signal to send the data to the peripheral unit by he control program. Some processing of the data may ıe accomplished while the data is in storage. Interac- ion between the coupler 50 and preprocessor 52 is hrough interrupts and various instructions from the ɹreprocessor 52.

Coupled to front end processor 52 and the coupler 50 is a data multiplex unit 54 which provides direct ac- :ess for any input/output communication transfer be- ween the memory of preprocessor 52 and the coupler 50. The functions of the data multiplex unit 54 is to en- ıble and identify the selected peripheral unit con- ıected to the preprocessor 52 and to control the execu- .ion of communication transfers between the prepro- :essor 52 and the channel 12.

The relationship between coupler 50, preprocessor 52 and data multiplex unit 54 is as follows. Upon an in- dication that a communication transfer will occur, cou- ɔler 50 makes a transfer request to data multiplex unit 54. The data multiplex unit 54 halts the program of pre- ɔrocessor 52 at an appropriate time, without the pre- ɔrocessor's knowledge. Moreover, the data multiplex ɹnit 54 specifies to the preprocessor 52 the selected pe- ripheral unit for which a communication transfer is de- sired. Upon completion of the transfer, the coupler then notifies the preprocessor 52 that the transfer has ɔeen made. The control program of the preprocessor processes the data and sends it out to one of the periph- ɜral units that is designated since each data word in- cludes the selected designation of the peripheral unit. Subsequent data transfers are done in the same manner between program instructions. These operations are accomplished by hardware circuits and do not affect the logical operation of the program which preproces- sor 52 is executing.

Preprocessor 52 has a number of local input/output units which are coupled to it. These input/output units may represent any number of well known devices such as, for example, magnetic tape, magnetic disc, teletype- writers, etc. These units are generally indicated at 56 and 58 as shown in FIG. 1. Since there may be any number of I/O units connected to preprocessor 52, the designations given are intended only to represent some of the plurality of I/O units rather than limit the number of actual I/O units which may be connected. Each I/O unit 56, 58 is coupled to preprocessor 52 via an I/O control unit 60, 62, respectively. I/O control unit 60 is coupled to preprocessor 52 via lines 64 and 66. I/O control unit 62 is coupled to preprocessor 52 via lines 68 and 70.

Each of the I/O units 56 and 58 may have informa- tion which is needed by the central data processor 10. Conversely, central data processor 10 may have infor- mation which it desires to provide to I/O devices 56, 58. In order to institute a communication transfer, a pe- ripheral unit address, or as it is known, a device ad- dress, is provided by the peripheral unit seeking com- munication. A device address is that identification by which a central data processor can selectively commu- nicate with an individual peripheral unit. Since a cen- tral data processor usually has a number of peripheral units attached to it, there are a plurality of device ad- dresses, each of which indicates one of the peripheral units.

In the usual situation, only one of the peripheral de- vices as indicated by peripheral units 56 and 58 would be able to enter a communication transfer with the cen- tral data processor 10. This resulted since the front end processor 52 was able to only provide one peripheral unit address and thus represent only one peripheral unit to the central data processor 10. This limitation was due, in part, to the rate of information able to be exchanged and also in part to the problems which exist with conversion of one type of information associated with a particular type of peripheral device to another type of information associated with a different type of peripheral device. However, by the invention described herein, preprocessor 52 is not so limited. Thus, prepro- cessor 52 may represent a variety of different periph- eral units, each of which has its own individual device address with respect to channel 12 much as input/out- put units 14 and 28 with respect to FIG. 1. As a result of this provision, there is no need for translating the in- formation to the one device represented, nor is there a need for overburdening the single device represented with a plurality of different signals thus obviating the problems of the prior art.

For each of the devices it represents, preprocessor 52 provides an automatic response such that the status and data of the peripheral unit which has been selected is immediately transferred to channel 12. Thus, for exam- ple, if devices 56 and 58 are electromechanical devices, such as, for example, magnetic tape and a magnetic disk, then a fast response to channel 12 must be pro- vided. This response limitation requires that each mag- netic device have its own individual address. Similarly, if other peripheral units are coupled to preprocessor 52, each must be able to be accessed quickly. The apparatus described herein provides for each peripheral unit to have its own address and thus meet this limitation.

Preprocessor 52 may also have connected to it via lines 76 and 78, a multiline input/output control unit 72 which connects a plurality of input/output units 74. As has been explained earlier, multiline I/O control unit 72 has only one device address which it provides to preprocessor 52. A subchannel address or, a header, indicates which one of the plurality of peripheral units 74 is being accessed.

Interaction between each of the peripheral units and preprocessor 52 is as follows. Preprocessor 52 accepts and examines each incoming character from each of the I/O control units. Preprocessor 52 is preprogrammed with a configuration of each of the systems to which it is attached and a special subroutine in the preprocessor's program exists for each of the various types of peripheral units connected to it. In accordance with the special subroutine preprocessor 52 determines whether a special control character exists and takes appropriate action to store the character in its memory or a buffer which is allotted the channel from which the character originated. Thus, for example, if an I/O unit 56 or 58 is a magnetic tape device, a special subroutine examines and interprets the information provided and initiates the appropriate action. Similarly, if I/O device 58 is a magnetic disk, the same operation as above would ensue.

Figure 2:
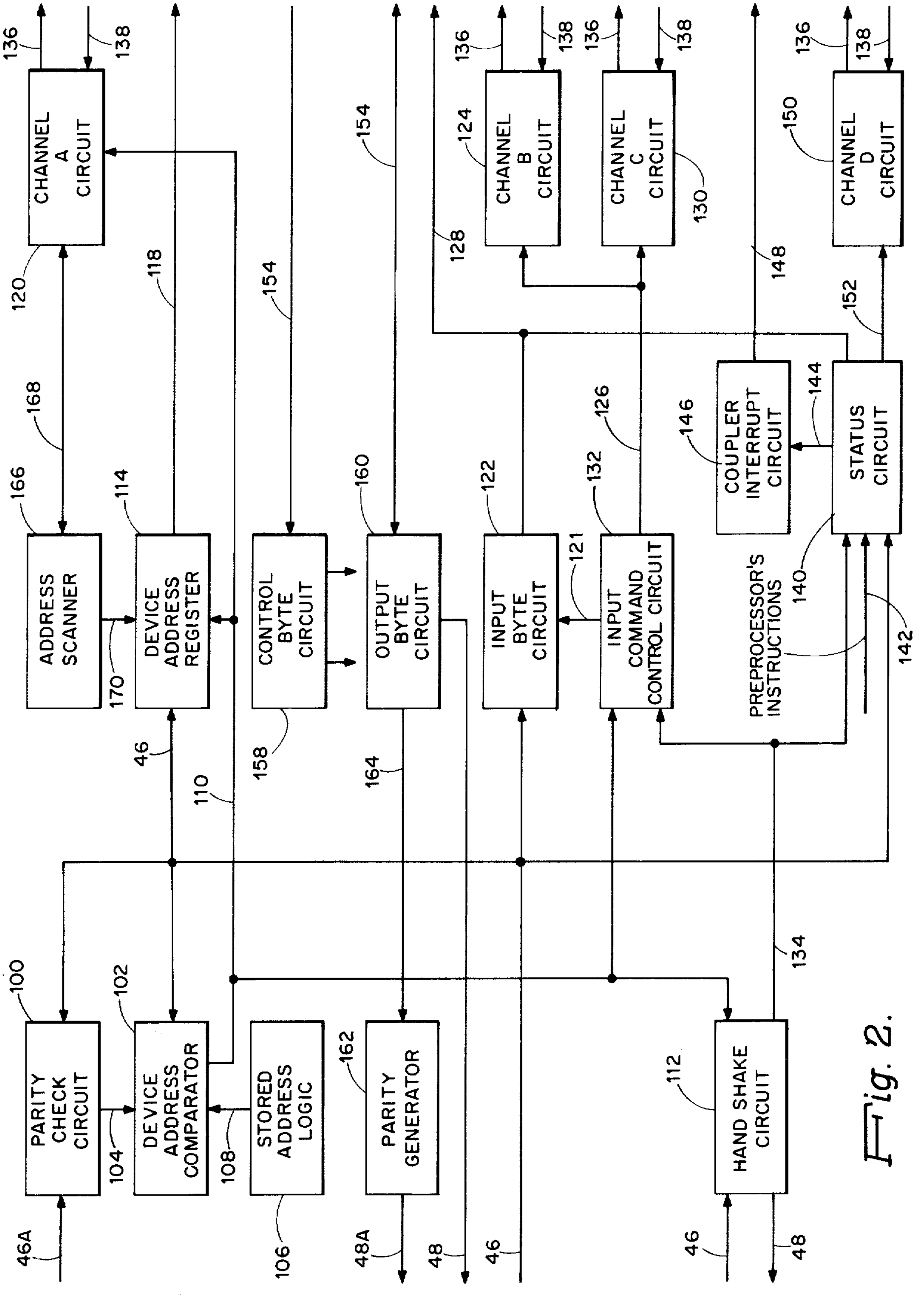
FIG. 2 illustrates a block diagram of the coupler connecting the front end processor to the central data processor.

Referring now to FIG. 2, coupler 50 is shown in greater detail. Coupler 50 detects each of the device addresses as presented by channel 12 for preprocessor 52 and initiates a transfer request such that the status and/or data of the accessed peripheral unit is made known. More specifically, the output from channel 12 is provided over bus 46 to parity check circuit 100. Parity check circuit 100 determines whether the address generated by channel 12 has correct parity. Thus, it compares the parity it generates with a parity bit provided over bus 46A which is received from channel 12. If proper parity has been provided, parity check circuit 100 provides an input to device address comparator 102 via line 104. If proper parity has not been generated over bus 46 from channel 12, then parity check circuit 100 would provide an error indication signal to be subsequently explained and would not provide any input to device address comparator 102.

Device address comparator 102 has a first input from bus 46 and a second input from stored address logic 106 via line 108. Stored address logic 106 contains each of the device addresses represented by coupler 50. If the device address comparator 102 determines that the address provided over bus 46 compares with a device address provided by stored address logic 106, then it provides the strobe signal via line 110 to handshake circuitry 112. As is understood by those skilled in the art, handshake circuitry 112 is responsive to the signals generated between preprocessor 52 and central data processor 10. When a determined sequence of signals has been received, handshake circuitry 112 permits data to be transferred in either direction until the time period allowed for the communication has been completed if the multiplex mode is provided or until the end of range of communication is reached by either preprocessor 52 or central data processor 10 if the selector mode has been forced. Thus, handshake circuitry 112 controls the input/output signals required to initiate a communication transfer.

Device address comparator 102 is also coupled to device address register 114 via line 110. Device address register 114 holds the address of the particular peripheral device designated. Thus, for example, the address provided by bus 46 to parity check circuit 100 and line 116 is stored by device address register 114. When strobed by the signal provided over line 110 from device address comparator 102, device address register 114 provides its contents to data multiplex unit 54 via bus 118. This address is an identifying indicia which determines the selected peripheral unit to preprocessor 52.

Device address comparator 102 is also connected via line 110 to a channel A control circuit 120. Channel A is a special channel since it has the capability of operating in either a dedicated cell mode of operation or a data multiplex mode of operation. It has been previously stated that preprocessor 52 has dedicated cells, each of which contains status and/or data information concerning the plurality of peripheral units represnted. In the dedicated cell mode of operation, channel A enables a transfer request for each of the plurality of peripheral units associated with preprocessor 52. This is in contradistinction to the usual occurrence wherein a channel is associated with only one peripheral unit. When the transfer request of channel A is acknowledged, channel A forces a starting address to preprocessor 52 via circuitry to be described in FIG. 4 which permits the device address, as provided by channel 12 and representing one of the devices, to be combined with a general address provided by channel A so as to indicate the dedicated cell location in the preprocessor's memory which contains status and/or data information for the selected peripheral device. Thus, channel A in the dedicated cell mode of operation enables external addresses to be provided to preprocessor 52.

Channel A may also be operative in the data multiplex mode; however, only one device would be able to be represented as is normal. For purposes of this invention, only the dedicated cell mode of operation will be described since it is this special feature which provides the gravemen of the invention.

In addition to channel A, three additional channels are provided which will subsequently be described. Each channel provides a request for transfer signal over line 136 and has an acknowldegement of the interrupt request over line 138. Since each channel has a specific function to perform the combination of these four channels, provide the capability which is needed for off-line loading of a program while still remaining within the frame allotted for a communication transfer. Channel A has the ability to both output and input status and/or data from preprocessor 52 and channel 12 and has the highest priority of the four channels.

Also connected to the output bus 46 of channel 12 is an input byte circuit 122. Input byte circuit 122 contains an eight bit register in addition to control lines for gating information into and out of the input byte register. After the address provided on bus 46 has been determined to be one which coupler 50 represents in addition to having correct parity, an internal signal as is well known in the art is generated which strobes the loading of the data from bus 46 into input byte circuit 122. Input byte circuit 122 provides a temporary storage area for information provided by channel 12. When nabled, after receiving the information, it provides its ontents to preprocessor 52 in accordance with the articular channel which has been activated.

Coupled to input byte circuit 122 and handshake cir- uit 112 is input command control circuit 132. Input ommand control circuit 132 is responsive to the tags rovided by channel 12 which indicate the type of in- rmation which is to be transferred. Circuit 132 de- odes the information and sets up appropriate transfers y providing strobing signals to input byte circuit 122 ia line 121 and to channel B and channel C control ircuits via line 126. Thus, input command control cir- uit 132 initiates the appropriate requests as received om channel 12.

If a tag is provided over bus 46 by channel 12, input ommand control circuit 132 enables channel B con- ol circuit 124 via line 126. Channel B is used to input ll data received from channel 12. When channel B is nabled by input command control circuit 132, it akes a transfer request similar to that described for hannel A. It should be noted that since channel A has ighest priority, channel B 124 must wait until the hannel A request has been completed. When ac- nowledged, channel B forces an address in the mem- ry of preprocessor 52. The data information for which hannel B makes the request is temporarily stored in nput byte circuit 122 and will be transferred to a por- ion of main memory associated with channel B upon nput command control circuit 132 enabling the trans- er over line 128. Once received, the control program f preprocessor 52 will perform its editing function on he data provided.

If a command tag is provided over bus 46 by channel 2, then channel C control circuit 130 is utilized. Chan- el C 130 is enabled by input command control circuit 32 via line 126. Channel C is not enabled until the de- ected device address has been ascertained with correct arity and the handshaking functions have been per- ormed. Channel C is used to input all commands re- eived from channel 12. Each command is inputted vith its device address as received from channel 12 an nitiates a command interrupt to preprocessor 52. These interrupts are shown over lines 136 and 138.

Handshake circuitry 112 is also coupled to status cir- uit 140 via line 134. Status circuit 140 provides stor- ge of channel status and coupler status. For example, f a particular error condition exists, status circuit 140 vould enable circuitry to indicate this error condition. Thus, if a parity error has been detected by parity heck circuit 100, an input to status circuit 140 via line 139 is provided. Status circuit 140 would then indicate o channel 12 via handshake circuitry 112 that proper arity had not been provided. Status circuit 140 has a second input from line 142 which is responsive to and nonitors the instructions generated by preprocessor 52.

Connected to status circuit 140 is coupler interrupt control circuit 146 via line 144. Circuit 146 controls all nterrupts caused by coupler 50 to preprocessor 52. This interrupt tells the program of preprocessor 52 that new information is being provided to preprocessor 52. The control program of preprocessor 52 is then aware hat it must process this new information. For a de- ailed explanation of the control circuits explained above, reference should be made to Honeywell Docu- nent No. 70130072709A, dated April, 1972, concern- ng Model 391B Coupler Interface Special Option.

Status circuit 140 is also connected to channel D control circuit 150 via line 152. A channel D input transfer request is initiated when a status condition as detected by status circuit 140 exists. Such a status condition may be an interface disconnect or an error condition in the coupler 50. Channel D is also coupled by request lines 136, 138 to the priority determination network of data multiplex unit 154. Of the four channels, it has lowest priority.

Four channels are required for each communication transfer since the time period for an exchange is short. By having each of the four channels transfer distinct types of information, the communication exchange is expedited. Moreover, the control program is immediately notified of the type of information which is to be transmitted and can correspondingly access this information quickly and easily. It should be noted that these four channels are internal to the couple itself and vis-a-vis channel 12, only one communication channel exists.

After preprocessor 52 has acknowledged the request to indicate the status of the selected peripheral unit as given by channel 12, it automatically responds with this information via bus 154. Bus 154 is connected to a control byte circuit 158 and an output byte circuit 160. Control byte circuit 158 initiates the mode of operation of the coupler 50. Thus, if the dedicated cell mode is provided, control byte circuit 158 enables this operation. Output byte circuit 160 receives data or status from preprocessor 52 which is to be delivered to channel 12. Output byte circuit 160 is coupled to bus 48 and to parity generator 162 via line 164. Output parity generator 162 generates odd parity for bytes delivered by circuit 160 to channel 12 via channel 12.

FIG. 2 also shows an address scanner 166 which enables each of the peripheral units to initiate communication with channel 12. The address scanner 166 is an eight bit binary counter which automatically scans all the device addresses represented by preprocessor 52. A 100 microsecond delay between each address scan cycle allows a minimum amount of processor time to be taken up by scanner 166. The address scanner 166, as it is incremented, sequentially transfers device addresses to device address register 114 via line 170 and simultaneously over line 168 requests channel A 120 for updated status of the peripheral units coupled to preprocessor 52. Thus, address scanner 166 automatically queries the status and data of each of the devices represented by coupler 50. This allows coupler 50 to ascertain the present status and initiate a communication transfer if such is indicated. In response to the scanner address and the request over channel A, status information from the dedicated cell associated with the particular device address is provided to control byte circuit 158. Depending on the information transferred, the control function is generated by control byte circuit 158 which initiates the sequence of events to be accomplished by the indicated control bits. If the control bits are not set, the scanner 166 is incremented and then queries the next peripheral device by loading the next address into device address register 114 and the process is again repeated. If a communication transfer should be made, address scanner 166 is inhibited from providing the device address of the next peripheral device until the transfer is complete. Thus, address scanner 166 provides for the output of various data information transfers for each of the device addresses represented by preprocessor 52. If an information transfer is to be provided, this information would be provided into output byte circuit 160 and then transferred to channel 12 subsequent to the handshaking routine as provided by handshake circuitry 112.

Figure 3:
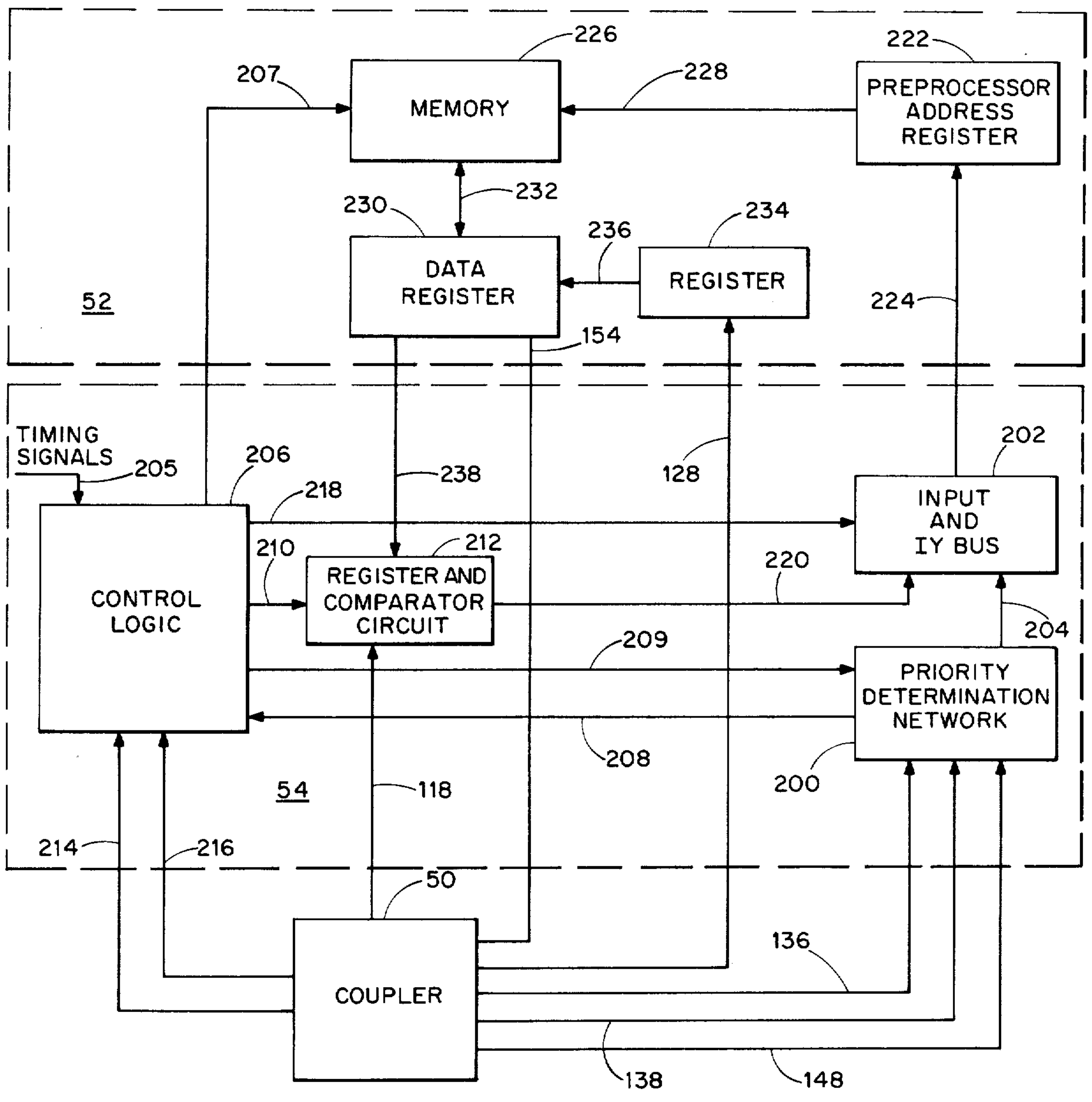
FIG. 3 illustrates a data multiplex unit which connects the front end processor to the coupler.

Referring now to FIG. 3 which shows the interrelationship of coupler 50, data multiplex unit 54, and preprocessor 52, coupler 50 is connected to priority determination network 200 via transfer request lines 136 and 138 and priority interrupt line 148. The priority determination network 200 operates in such a manner that the highest priority channel of those which are set forces the starting address location for that channel on the input and I/Y bus 202 via a line 204. In addition, in response to the request for transfer signal of coupler 50, the priority network 200 generates signals which prepare the preprocessor for execution of an interrupt cycle. It accomplishes this feature by generating a request signal to the control logic 206 via line 208. This signal inhibits all transfer paths to the input bus 202 other than the I/Y bus and inhibits the setting of a fetch cycle flip-flop (not shown) associated with preprocessor 52 such that the next instruction is not processed. During this time, the program of preprocessor 52 is not aware that it has been interrupted and that a communication transfer is occurring. All information transfers and corresponding internal operations of coupler 50 and data multiplex unit 54 occur during the program interruption.

In addition to inhibiting the normal operation of preprocessor 52, control logic 206 also provides for the cycles to be utilized during the communication transfer. While a description of these cycles is not necessary for a complete understanding of the invention, an explanation of them will help in understanding the operation of the system. Thus, control logic 206 receives as inputs 205 timing level signals from preprocessor 52. The response to these timing level signals provides for the gating signals to enable operation of the data multiplex unit 154. More specifically, four cycles of operation are provided by control logic 206. These four cycles are first the selecting of the dedicated cell associated with then-active channel. As was indicated previously, the highest priority channel as determined by priority determination network 200 forces an address into input and I/Y bus 202. This address is then gated into preprocessor address register 222 and via line 228 addresses a memory location of memory 226 of preprocessor 52 associated with the enabled channel. The output of memory 226 is transferred to a data register 230 via line 232 and then into a register and comparator circuit 212 via line 238. This completes the first cycle. In the second cycle, the information from the memory location of the active channel now resident in register and comparator circuit 212 is coupled with the device address presented by coupler 50 over line 118. This combined address specifies the dedicated cell in memory 226 associated with each of the peripheral units coupled to preprocessor 52. This combined address is then transferred to address register 222 and accesses memory 226 associated with this address. This information is the status or data of the selected peripheral unit. This completes the second cycle of operation. The third cycle determines whether or not a completed message has been provided. In cycle four, the contents of the starting address of the active cell are then transferred back into memory 226 from register and comparator circuit 212. Both the third and fourth cycles concern internal operations of the multiplex unit and are not fully described since they are not essential for the understanding of the present invention.

Control logic 206 is also responsive to two signals provided by coupler 50. These signals are provided over lines 214 and 216 from coupler 250 and enable the control logic to specify both the mode of operation of the data multiplex unit 54 and also to specify whether the information being transferred is generated by channel 12 or by preprocessor 52. This signal is provided over line 210 and will be explained in more detail in reference to FIG. 4. This signal is important since, in the dedicated cell mode of operation, coupler 50 will be supplying part of the address which accesses the memory 226 of preprocessor 52. Thus, an external device, i.e., the coupler 50, will be providing to the preprocessor 52 part of the address necessary to access the information associated with a peripheral unit of the preprocessor 52. In the data multiplex mode of operation, the complete address is supplied by the memory 226 of preprocessor 52.

Control logic 206 also provides a signal via line 218 which enables the address from input bus 202 to be provided to address registor 226. This is a strobing signal which was indicated earlier when the explanation of inhibiting the normal memory operations was explained.

Figure 4:
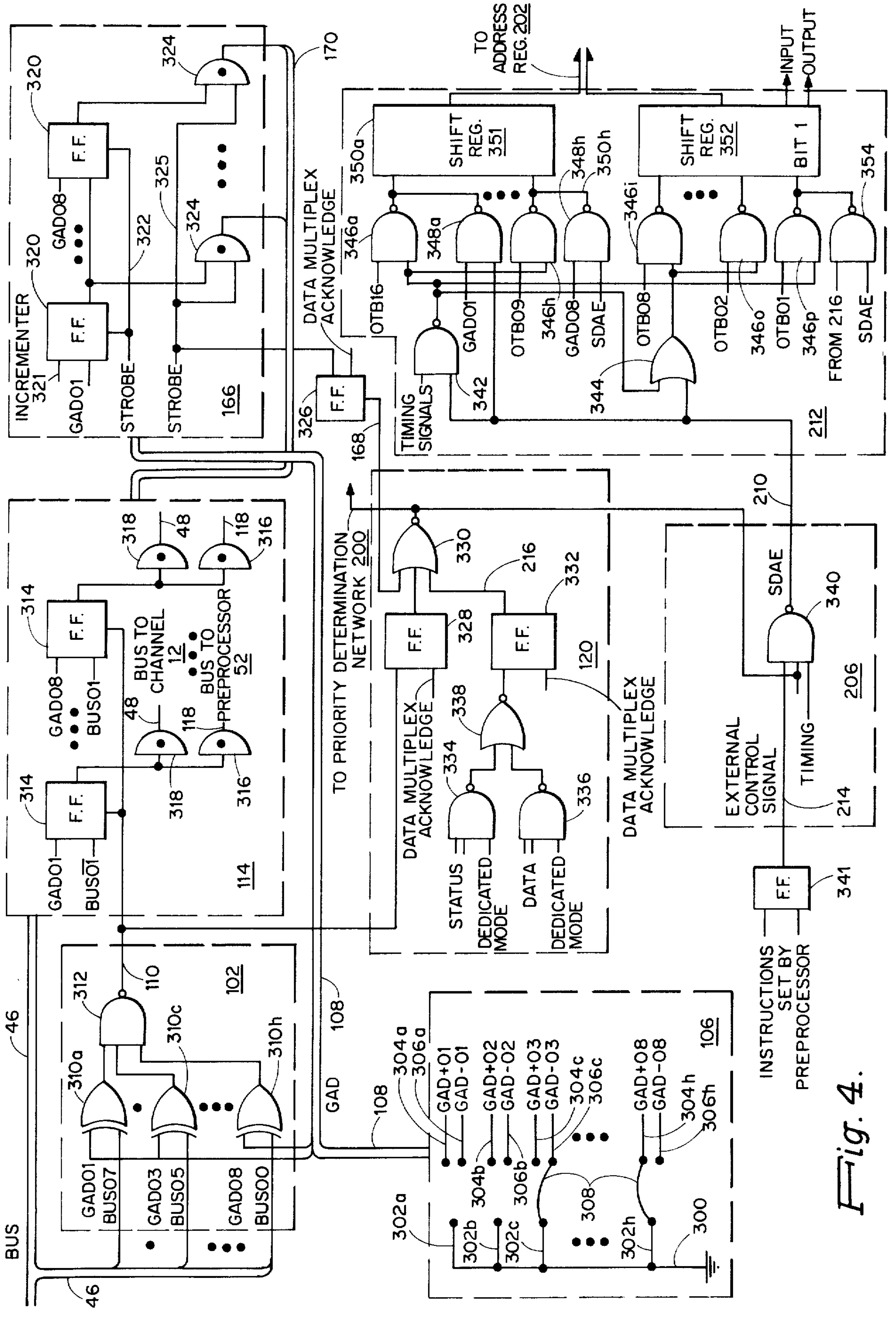
FIG. 4 is a detailed schematic diagram illustrating a preferred embodiment of the logic circuitry utilized in the coupler and data multiplex unit.

Register and comparator circuit 212 provides the addresses for main memory 226 of preprocessor 52 when a communication transfer is occurring. More specifically, when in the data multiplex mode, register and comparator circuit 212 provides the address received from memory 226. This address resulted from the forced channel address provided by priority determination network 200. However, for purposes of this invention, explanation will be limited to the dedicated cell mode of operation which provides for a plurality of addresses even though only one forced channel address is provided by priority determination network 200. In this mode of operation, register and comparator circuit 212 receives a device address as provided by device address register 114 from either channel 12 or scanner 166 via line 118 as shown in FIG. 2. It then combines this address with the address provided by memory 226 and forced by the enabled channel. This combined address is the complete memory address needed to locate the status and/or data of the selected peripheral unit. This combination will be more readily understood when FIG. 4 is explained. This combination occurs during cycle 2 of the data multiplex unit 54.

The address enabled by register and comparator circuit 212 is provided to input and I/Y bus 202 via line 220 and is then transferred to CPU address register 222 via line 224. This address will then access a location in main memory 226 and the status and data information associated with the selected peripheral device will then be provided. More specifically, memory 226 provides information to a data register 230 over line 232. Data register 230 is coupled to output bus 154 of coupler 50. In particular, the data register provides the status and/or data information to the output byte circuit 160 and control byte circuit 158. Data register 230 is also connected to register 234 via line 236. Register 234 is connected to the input bus 128 of the coupler 50 and transfers information to be stored in memory 226. This situation occurs when channel 12 is providing information to the preprocessor 52. Thus, when CPU address regiser 222 addresses memory in order for information to be placed into memory, this information is provided over line 128 to register 234. Register 234, in turn, provides the information to data register 230 where it is the written into memory 226. The general logic discussed in FIG. 3 is fully shown in Honeywell Document No. 1300719578, dated November, 1969 and entitled "DMCC Special Option Manual".

Memory 226 of preprocessor 52 includes a special buffer section which has dedicated cells containing information for each of the peripheral units associated with preprocessor 52. The buffer memory has two sections. The first section includes locations 000 through 377 in octal code. Each of the these locations contains a byte which indicates the control of coupler 50. This byte is transferred to control byte circuit 158 and provides for this operation. The second memory section includes locations 400 through 777 in octal code and has the control and data bytes associated with each of the peripheral units of preprocessor 52. This byte is provided to output byte circuit 160 and subsequently to channel 12 and provides the information required for the communication transfer. The reason that these memory sections are provided is that preprocessor 52 has the capability to represent up to 256 input/output units. Each of these units will have a dedicated cell in memory 226 which can be immediately referenced when a communication transfer occurs. The above-two memory sections form one sector of main memory 226. This buffer memory should be distinguished from the memory locations associated with each of the channels explained earlier. The memory locations associated with each channel are located in a different portion of memory 226 and specify the starting and ending addresses associated with that particular channel. In the usual situation, information contained in the memory locations associated with the channel indicates the dedicated cell of a particular peripheral unit associated with the channel. However, in the utilization of channel A, only a portion of the address provided by the channel's memory location is used since the address of the specified peripheral unit forms the other portion. Thus, channel A is associated with a plurality of peripheral units.

Referring now to FIG. 4, the detailed circuitry which provides for the operation of the data communication system will be explained. The apparatus of FIG. 4 provides for the recognition and communication transfer of the various peripheral units associated with preprocessor 52 and coupler 50. As was stated earlier, stored address logic 106 provides the plurality of peripheral unit addresses which coupler 50 recognizes. Stored address logic 106 includes a line 300 which has coupled to it eight lines, 302*a* to 302*h*. Selectively coupled between lines 302 and 304, 306 are jumper wires 308. If a jumper wire 308 is connected to a positive source (not shown), as for example, GAD08 as shown in FIG. 4 at 306*h*, a binary ONE for this address is provided. If jumper wire 308 is connected to ground, as for example GAD03 as shown in FIG. 4 at 306*c*, a binary ZERO for this address is provided. Since the coupler represents a multiple of peripheral units, and since it has been assumed that for the particular example preprocessor 52 will represent four input/output units, the last two bits of the binary number provided by stored address logic 106 are not connected. With this situation, any device address which corresponds to the first six bits of the binary number will enable the device address comparator 102.

The device address provided by stored address logic 106 is provided via bus 108 to comparator circuit 102. Device address comparator 102 has a second input from bus 46 of channel 12, the latter inputs are shown as signals BUS07 to BUS00. One input from stored address logic 106 and one input from bus 46 are provided to exclusive OR gates 310A to 310H. As is well known, exclusive OR circuit will provide a high binary output signal when the input signals are unlike and a low output signal when the input signals are identical. The output of exclusive OR gates 310 is provided to a NAND gate 312. However, exclusive OR gates 210*a* and 310*b* are not connected to NAND gate 312 but rather are allowed to float by omission of any connection coupling them to NAND gate 312. The floating values of exclusive OR gates 210*a* and 310*b* result in positive response to any of the addresses provided over bus 46. Thus, it is recognized that four device addresses may be detected by allowing the two exclusive OR gates 210*a* and 310*b* to float.

If all the signals are presented by bus 46 are identical to the signals provided by stored address logic 106, NAND gate 312 is enabled to provide a high output signal over line 110. If any one of the inputs to NAND gate 312 is high and therefore unlike the address represented by stored address logic 106, then NAND gate 312 is not enabled.

When enabled, device address comparator 102 provides strobing signals via line 110. More specifically, line 110 is connected to strobe device address register 114. Device address register 114 comprises a plurality of flip-flops, such as, for example, JK flip-flops, having input connections from channel 12 via bus 46 and also from scanner 166 via line 170. The addresses placed in device address register from these two sources are enabled when an enabling signal from line 110 is provided. Flip-flops 314 of device address register 114 are coupled to register and comparator circuit 212 of data multiplex unit 54 via line 118 AND gate 316 and to channel 12 via bus and AND gate 318. When in the dedicated cell mode of operation, the address provided over line 118 indicates the specific peripheral unit which channel 12 is designating.

Device address register 114 is also connected to scanner 166 via line 170. Scanner 166 comprises eight flip-flops for an eight bit shift counter 320 which has input signals coupled to each of the gates and provided by stored address logic 106. Also connected to the first flip-flop of address scanner 166 is a line 321 which provides an incrementing pulse to the flip-flop 320. This pulse increments successive device addresses which preprocessor 52 represents. Since only four devices addresses have been given in the particular example, the first six gates of address scanner 166 are fixed. Thus, only the last two gates are incremented and provide for the selection of a particular peripheral unit associated with preprocessor 52. The last two gates, as is well known, will provide for the maximum of four different peripheral unit addresses. Upon receiving a strobe signal via line 322 which may be derived from an instruction which enables the scanner, flip-flops 320 provide output signals to AND gates 324. AND gates 324 are coupled to the input of flip-flops 314 of device address register 114.

When address scanner 166 provides a device address to device address register 114, it also initiates a request for transfer for the particular peripheral unit. It accomplishes this by enabling a flip-flop 326 which, in turn, enables a request for transfer of channel A via line 168. With the address provided by address scanner 166, the dedicated cells of memory 226 are queried as to their present status. If there is an indication that the designated peripheral unit contains information which is desired to send to channel 12, control byte circuit 158 will enable this operation. If no such indication is given by the data provided from the dedicated cell location of memory 226, then address scanner 166 will be incremented via line 321 and the next device address will be queried as to possible information transfers. Thus, it is apparent that address scanner 166 provides for preprocessor 52 to initiate a communication transfer with channel 12.

Channel A 120 is also controlled by two other inputs which enable it to make a request for transfer. This request for transfer is provided over NOR gate 330 which is connected to priority determination network 200. As it was explained previously, one input is from address scanner 166 via flip-flop 326 and line 168. The second input is provided by device address comparator 102 via line 110 and flip-flop 328 into NOR gate 330. When device address comparator 102 indicates that a proper address has been strobed, its sets flip-flop 328 such that a high signal to NOR gate 330 is provided thus enabling a request for transfer and a priority interrupt.

The third input to NOR gate 330 from flip-flop 332. Flip-flops 326, 328, 332 may be any standard flip-flops as JK flip-flops which are well known in the art. Flip-flop 332 is connected to handshake circuitry 112 and is responsive to the signals that indicate that the conditions for a communication transfer have been met. Thus, flip-flop 332 is shown as connected to NAND gates 334 and 336 and NOR gate 338. NAND gate 334 is enabled when the sequence of events using handshake circuitry 112 indicates that a status transfer should be made and that the dedicated cell mode of operation is enabled. When this condition occurs, NAND gate 334 provides a signal to NOR gate 338 which in turn sets flip-flop 332. The high signal from flip-flop 332 is provided to NOR gate 330 and enables channel A to make a request to transfer. NAND gate 336 is responsive to the handshake circuitry 112 also and, more particularly, is responsive to data transfer and the dedicated cell mode of operation. When enabled, NAND gate 336 provides a signal to NOR gate 338 enabling flip-flip 332 to provide a high signal to NOR gate 330 and request the transfer. Each of the flip-flops 326, 328 and 332 are cleared by a data multiplex acknowledge signal at the end of a complete cycle of operation. In this particular example, four cycles provide for a complete communication transfer.

As has been stated previously, NOR gate 330 is coupled to priority determination network 200 and enables determination network 200 to make a request for interrupt of the preprocessor's 52 operation. At the end of the current instruction which preprocessor 52 is executing, priority determination network will provide the enabling signals to allow the communication interrupt to occur.

During the interrupt operation, control logic 206 provides for the exchange of information. Control logic 206 is only partially shown since the timing signals and further control signals and associated circuitry that it provides as explained with respect to FIG. 3 may be of any standard design and do not form part of this invention. NAND gate 340 has three inputs, one of which is derived from an external control function of the coupler. This external control function is provided when the dedicated mode of operation is to be utilized. Thus, this external control signal is shown as coming from flip-flop 341 which has as its input instruction set by the preprocessor 52 and when reset, which is the normal situation, provides a signal over line 214 to NAND gate 340. A second low input is provided by NOR gate 330 and NAND gate 340 and a third input is the timing signals which enable gate 340 at the proper time in the cycle of operation.

When enabled, NAND gate 340 provides a SDAE signal to NAND gate 342 and OR gate 344. SDAE is the selected device address enable signal. When this signal is provided over line 210, it provides a strobe signal to register and comparator circuit 212 such that the device address is presented by device address register 114 is transferred. If NAND gate 340 is not enabled, then NAND gate 342 is enabled. This NAND gate enables the entire channel address, which would occur in the data multiplex mode of operation, to be transferred into register and comparator circuit 212. This results since OR gate 344 is responsive to either NAND gate 340 or NAND gate 342. Thus, in the dedicated mode of operation, NAND gate 340 is enabled and allows the device address as presented either by scanner 166 or by channel 12 to be transferred.

The output of control circuit 206 is coupled to NAND gate 348A to 348H as shown by the SDAE signals connected to one input. The other input of NAND gates 348A to 348H are connected to device address register 114 and are shown as the GAD01 to GAD08 signals. The output of NAND gates 348A to 348H are connected to lines 350A to 350H. These lines are also coupled to the output of NAND gates 346A to 346H. NAND gates 346A to 346H have two inputs, one of which is connected to the output of NAND gate 342 and the other input connected to the output of memory 226. This is shown as OTB16 to OTB09. When the selected channel has forced an address to memory 226, the information contained in that memory location will be provided to register and comparator circuit 212. This information is shown as OTB01 to OTB16. However, if we are in the dedicated mode of operation, the lower address which represents the device address of a particular peripheral unit is desired. Under this situation, the control lead to OTB16 to OTB09 will not be enabled since NAND gate 342 will not be enabled. Rather, the output of NAND gate 340 will be provided and this will allow the address as provided from devices address register 114, i.e., GAD01 to GAD08, to be enabled into a shift register 351. Stated differently, NAND gates 348A to 348H each have one control lead connected to the output of NAND gate 340. The other lead of each gate is connected to the appropriate flip-flop in device address register 114. When the output of gate 340 is high, then the address is provided by flip-flops 314 is gated into NAND gate 348 and then, in turn, into shift register 351 via lines 350A to 350H. Thus, the shift register 350 receives the device address in the dedicated mode of operation. In a data multiplex mode of operation, NAND gate 340 is not enabled but NAND gate 342 is. NAND gate 342 enables NAND tes 346A to 346H which transfer the complete out-t of memory 226 into shift register 351.

The first eight bits received from memory are pro-led to NAND gates 346I to 346P. These NAND gates ve a second input coupled to the output of NOR gate 4 which is enabled by either the selected device ad-ess enable signal from NAND gate 340 or by NAND te 342. NAND gates 346I to 346P are connected to ;hift register 352 which may also be eight flip-flops of e JK type. These NAND gates 346I to 346P provide r the sector address of dedicated cells. As was stated rlier, memory 226 contains a buffer memory section r the dedicated cells associated with preprocessor 52. ıe address provided by NAND gates 346I to 346O in-cate the sector in which this buffer memory is pro-ded.

Shift register 352 also has connected to its first flip-›p or first position of the shift register a NAND gate ;4. NAND gate 354 is coupled to the output of AND gate 340 via line 210 and the high output 216 flip-flop 332. Since flip-flop 332 is coupled to hand-ake circuitry 112, the signal it provides to NAND ıte 354 will indicate an input or output operation vis-vis channel 12. Thus, if NAND gate 340 is enabled dicating the dedicated cell mode of operation and ıp-flop 332 is providing a high signal, NAND gate 354 enabled and indicates to the register and comparator rcuit 212 that the input mode of operation is being ·ovided. If the output of flip-flop 332 were low, then ıe output mode would be indicated and shift register 52 would be set accordingly. The output of shift regis-r 352 for bit 1 is shown as an input or output signal epending upon the operation of NAND gate 354. This ıput or output signal is coupled to memory 226 and ıdicates to memory whether a read or write operation to be provided. If the input signal is given, then a rite cycle is provided; conversely, if an output signal given, then the read cycle is provided. The reason ıat the input or output mode is identified is to enhance ıe operating speed for each communication transfer f this unit. If the input or output mode were not identi-ed, then the program would have to be interrogated ı order to find out whether the input or output mode ʼould be provided. The time constraints provided by ıe program interrupt would not allow this situation to ccur.

Thus, in viewing the register and comparator circuit 12, it is seen that a provision for combining the device ddress in order to specify a particular peripheral unit ttached to preprocessor 52 is made. Register and com-›arator circuit 212 then provides this address to input nd I/Y bus 202 where it will subsequently access the ledicated cell of main memory 226. This accessed ded-cated cell located in main memory 226 provides the tatus or data information which has been requested for he communication transfer.

The overall operation of a communication transfer vill now be explained. In order to bring forth the prin-iples of this invention, the operation will be described ıerein with respect to an input from channel 12. Also, t is assumed that channel A 120 is utilized and that a ledicated cell mode of operation has been specified.

When channel 12 initiates a communication transfer, t sequences through a series of addresses and provides ı selected address over bus 46. When address compara-or circuit 102 detects that the address provided over ›us 46 compares favorably with the one provided by stored address logic 106 and that proper parity is correct, NAND gate 312 is enabled. NAND gate 312 provides a signal over line 110 which initiates four operations. First, it strobes the device address which channel 12 has placed on bus 46 into device address register 114. Second, it enables flip-flop 328 such that a signal to NOR gate 330 requesting a transfer of information is provided. The information desired is the present status of the peripheral unit associated with preprocessor 52. Third, the signal over line 110 sets up the initial selection in input command control circuit 132 such that the proper sequence of events occurs. Fourth, it enables handshake circuitry 112 such that the handshake routine is enabled.

The transfer request of NOR gate 330 is provided into priority determination network 200 of the data multiplex unit 54 along with the signal from coupler interrupt circuit 144. When the priority of all the active channels that have requested transfer has been made, the one with the highest priority is stated as the active channel. In this instance, it is assumed that channel A 120 is the highest priority. The signal generated from channel A into priority determination network 200 results in priority determination network 200 forcing an address associated with channel A 120 into input and I/Y bus 202. Once the interrupt condition occurs, the addres of input and I/Y bus 202 is transferred into CPU address register 222 where it accesses a memory location of memory 226. The information in this memory location is an address which identifies the buffer section of memory 226 previously explained. This address is outputted to register and comparator circuit 212 within the data multiplex unit 54.

In the next cycle of operation, the inputs to NAND gate 340 are all low since a dedicated mode of operation is specified thereby providing a high SDAE signal. When the address from memory 226 is provided to register and comparator circuit 212, NAND gate 340 enables NAND gates 348A to 348H which provide the device address as presented from device address register 114. NAND gate 340 also enables OR gate 344 thereby providing the sector address received from memory 226. As a result, register and comparator circuit 212 has the buffer sector address as provided by the dedicated cell of memory 226 associated with channel A 120 and inputted to NAND gates 346I to 346O and the device address presented from device address register 114 into NAND gates 348A to 348H. The contents of register and comparator circuit 212 are then transferred into input and I/Y bus 202. This is the address of the dedicated cell associated with one of the peripheral units of preprocessor 52. The information being addressed in the status contained in a dedicated cell associated with the selected peripheral unit as indicated by channel 12. This information is transferred from memory 226 to data register 230 via line 232. Data register 230 is coupled to the output bus 154 provided to coupler 50. Bits 1 to 8 of the status are loaded into control byte circuit 158 and provide for internal operations of coupler 50. The status information for channel 12 is provided into the output byte circuit 160 and are bits 9 to 16. This status byte is then transferred to chanel 12 via bus 48 with parity generator 162 providing the proper parity to channel 12.

Two additional cycles of operation of the data multiplex unit 54 will subsequently ensue with the timing signals provided for general housekeeping functions in order to keep the status and present address of the dedicated cell associated with channel A. The completion of the status transfer now initiates the handshake operation from coupler 50 to channel 12. Subsequent to channel 12 accepting the status from coupler 50, the next cycle of operation will be enabled. This is an input cycle request.

For this input cycle request, a signal is sent to flip-flop 332 of data multiplex unit 54 to indicate that an input transfer to memory 226 of preprocessor 52 is provided. NAND gate 354 is enabled thus providing for the output of shift register 352 to set up the data transfer paths such that memory 226 receives the data from channel 12 via input byte circuit 122. Data is exchanged via channel B 124 until and end-of-range signal is given by either of the devices. The program of preprocessor 52 checks the data to see when it is cleared and then is reloaded and the process is subsequently repeated. When channel 12 is finished sending data, a stop order will be sent via channel C 130 at the time of the last data byte indicating the end of the information transfer. The program in preprocessor 52 will then load ending status into the status cell and the communication transfer between the peripheral unit of preprocessor 52 and channel 12 will have been completed.

If an output operation was to be performed, then address register scanner 166 would provide the address to device address register 144. Address scanner 166 would enable flip-flop 326 to provide a request for transfer via NOR gate 330. The same operation of register and comparator circuit 212 with the same cycles of operations as indicated earlier would result. However, NAND gate 354 would be providing a low input signal which would indicate that an output mode of operation is provided. Each of the data byte transfers would work on the same principles of operation as described earlier with respect to the input mode.

Although it has been shown, described and pointed out the fundamental novel features of the invention applied to the preferred embodiment, it will be understood that various omissions, substitutions and changes in the form and details of the device illustrated and its operation may be made by those skilled in the art without departing from the spirit of the invention. It is the intention, therefore, to be limited only as indicated by the scope of the following claims.

What is claimed is:

1. A data communication system comprising:

a first plurality of peripheral units represented by a second plurality of addresses, a second plurality of peripheral units represented by a first plurality of addresses, a central data processor, said central data processor including means for generating first signals representative of said first plurality of addresses, said first signals including second signals representative of said second plurality of addresses, a front end processor, said front end processor including means for generating third signals, said third signals similar to said second signals and said third signals also representative of said second plurality of addreses, first means for coupling said first plurality of peripheral units with said front end processor, second means for coupling said second plurality of peripheral units with said central data processor, first means for enabling, means for coupling said first means for enabling for receipt of said first signals from said central data processor, said first means for enabling responsive to said first signals, for enabling the coupling provided by said second means for coupling, in order to provide a communication path between said central data processor and the one of said second plurality of peripheral units represented by the received one of said first signals, second means for enabling, means for coupling said second means for enabling for receipt of said third signals from said front end processor, said second means for enabling responsive to said third signals, for enabling the coupling provided by said first means for coupling, in order to provide a communication path between said front end processor and the one of said first plurality of peripheral units represented by the received one of said third signals, third means, coupled to both said front end processor and said central data processor, for coupling said front end processor with said central data processor, third means for enabling, and means for coupling said third means for enabling for receipt of said first signals from said central data processor, said third means for enabling responsive to said second signals included in said first signals, for enabling the coupling provided by said first means for coupling, said front end processor and said third means for coupling, in order to provide a communication path between said central data processor and said first plurality of peripheral units, said third means for enabling including means for detecting, means, coupled with said central data processor, for transferring said first signals to said means for detecting, said means for detecting coupled to said means for transferring, for detecting said second signals included in said first signals, means, coupled to said means for detecting, for prôviding to said front end processor said second signals denoting said first plurality of peripheral units.

2. The system as defined in claim 1 and wherein said means for detecting includes:

means for generating second signals corresponding to said second plurality of addresses, each of which identifies one of said first plurality of peripheral units, means coupled to said transferring means and to said generating means, for comparing said first signals of said first plurality of addresses provided by said means for transferring with said second signals of said second plurality of addresses provided by said means for generating, and means responsive to said means for comparing for indicating that said first signals are identical with said second signals.

3. The system as defined in claim 2 and wherein said means for generating includes:

first means for supplying a plurality of high signals, second means for supplying a plurality of low signals, means for selectively coupling some of said plurality of high signals and some of said plurality of low signals, and means responsive to said means for selectively coupling for ordering said high and low signals to a predetermined configuration consistent with said second addresses of said front end processor, said means for ordering floating the lowered ordered signals so that plurality of second addresses are represented.

4. The system as defined in claim 1 and wherein said front end processor includes:

a memory, one portion of said memory having a plurality of dedicated cells, each of which stores the status of one of said first plurality of peripheral units, and wherein said providing means in response to said detecting means accesses one of said dedicated cells of said memory so that said status of said each of said first plurality of peripheral units is automatically provided.

5. The system as defined in claim 4 wherein said selectively providing means includes:

means responsive to said detecting means for storing said second signals provided by said central data processor, channel means responsive to said detecting means for initiating an interrupt request to said front end processor, means responsive to said channel means for forcing an address to said memory corresponding to said channel means, means coupled to said memory for receiving output signals from said memory corresponding to said address provided by said channel means, and means for combining said signals from said storing means with said output signals of said memory, said combining means providing said second addresses to said dedicated cells in said memory.

6. The system as defined in claim 5 and further including:

means coupled to said front end processor for indicating a dedicated cell mode of operation, fourth means responsive to said channel means and to said indicating means for enabling a first strobing signal, fifth means responsive to the absence of said first strobing signal for enabling a second strobing signal, sixth means responsive to said fourth and fifth enabling means for enabling a third strobe signal, and wherein said combining means includes, a plurality of first gate means responsive to said first strobe signal and to said storing means for providing a first portion of a dedicated cell address, a plurality of second gate means responsive to said second strobe signal and to said output signals of said memory for providing a different first portion of a dedicated cell address, a plurality of third gate means responsive to said third strobe signal and to said output signals of said memory for providing a second portion of a dedicated cell address, and register means responsive to said first, second and third gate means for providing to said memory a dedicated cell address.

7. The system as defined in claim 5 and further including:

scanner means coupled to said generating means for interrogating said dedicated cells of said memory, said scanner means enabling said storing means and said channel means to provide said second addresses to said dedicated cells of said memory, and said front end processor in response to said scanner means initiating a communication transfer with central data processor.

8. The system as defined in claim 7 wherein said channel means includes:

a first channel responsive to said transferring means and said detecting means for conveying initial status and data of said front end processor to said central data processor, a second channel responsive to said detecting means for conveying data from said central data processor to said front end processor, a third channel responsive to said means for detecting for conveying commands from said central data processor to said front end processor, and a fourth channel coupled to said transferring means for conveying information about said status or data transfer.

9. The system as defined in claim 1 wherein said first plurality of peripheral units includes a plurality of different peripheral unit types such as magnetic tape units, magnetic disks, teletypewriter units, and multiline controllers coupling a plurality of communication lines.

* * * * *